United States Patent
Bussear et al.

(10) Patent No.: US 9,177,691 B2
(45) Date of Patent: Nov. 3, 2015

(54) POLARIZABLE NANOPARTICLES AND ELECTRORHEOLOGICAL FLUID COMPRISING SAME

(75) Inventors: Terry R. Bussear, Spring, TX (US); Soma Chakraborty, Houston, TX (US); Michael H. Johnson, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 342 days.

(21) Appl. No.: 13/235,762

(22) Filed: Sep. 19, 2011

(65) Prior Publication Data

US 2013/0069022 A1    Mar. 21, 2013

(51) Int. Cl.

| | |
|---|---|
| C08F 20/16 | (2006.01) |
| C08F 12/06 | (2006.01) |
| C08F 12/08 | (2006.01) |
| H01B 3/02 | (2006.01) |
| H01B 3/20 | (2006.01) |
| B82Y 30/00 | (2011.01) |

(52) U.S. Cl.
CPC H01B 3/02 (2013.01); C08F 20/16 (2013.01); H01B 3/20 (2013.01); B82Y 30/00 (2013.01)

(58) Field of Classification Search
CPC ............................. C10M 171/001; H01B 3/465
USPC ........................................................ 252/572
See application file for complete search history.

(56) References Cited

U.S. PATENT DOCUMENTS

| | | | | |
|---|---|---|---|---|
| 5,252,249 | A * | 10/1993 | Kurachi et al. | 252/71 |
| 5,252,250 | A * | 10/1993 | Endo et al. | 252/73 |
| 6,096,235 | A * | 8/2000 | Asako et al. | 252/78.3 |
| 7,981,315 | B2 * | 7/2011 | Lu et al. | 252/73 |
| 8,277,402 | B2 * | 10/2012 | Chisena et al. | 602/20 |
| 2003/0216502 | A1 * | 11/2003 | McElrath et al. | 524/507 |

FOREIGN PATENT DOCUMENTS

| | | |
|---|---|---|
| JP | 7331275 A | 12/1995 |
| KR | 10-659590 * | 12/2006 |
| KR | 10-2011-0093203 * | 9/2011 |

OTHER PUBLICATIONS

Wen Ling Zhang. J. Mater. Chem. 2011, 21. 6916-6921.*
C. H. Andersson et al. Eur.J.Org.Chem. C. Nanotubes @009, 4421-4428.*
J.Org.Chem. Zhu & Wang J. Org. Chem. 4426-4428, 2009.*
Seok Ho Kang et al. Top. Curr. Chem. 1999, 199. 1512-1516.*
Functionalized Fullerenes Andersson, A Thesis, Uppsala University Sweden, 2011.*
Ramanathan et al., Functionalized graphene sheets for polymer nanocomposite. Nature, Nanotechnology, vol. 3, Jun. 2008, 327-331.*
Wen Ling Zhang et al., "Graphene oxide coated core-shell structured polystyrene microspheres and their electrorheological characteristics under applied electric field" Journal of Materials Chemistry; 2011, 21, pp. 6916-6921.
International Preliminary Report on Patentability; International Application No. PCT/US2012/056041; International Filing Date: Sep. 19, 2012; Date of Mailing: Mar. 25, 2014; 7 pages.
International Search Report and Written Opinion; International Application No. PCT/US2012/056041; International Filing Date: Sep. 19, 2012; Date of Mailing: Feb. 28, 2013; 9 pages.

* cited by examiner

*Primary Examiner* — Nicole M Buie-Hatcher
*Assistant Examiner* — M. Reza Asdjodi
(74) *Attorney, Agent, or Firm* — Cantor Colburn LLP

(57) ABSTRACT

An electrorheological fluid comprises a nanoparticle composition comprising a nanoparticle, uncoated or coated with a polymeric or metallic coating and covalently bonded to or coated on a surface of a polymeric or inorganic particle; and a dielectric fluid having a dielectric constant lower than that of the nanoparticle composition. A nanoparticle composition also comprises a carbon-based nanoparticle, covalently bonded to or coated on a surface of a conjugated polymer particle or inorganic particle, wherein the nanoparticle composition is a dielectric material.

13 Claims, No Drawings

POLARIZABLE NANOPARTICLES AND ELECTRORHEOLOGICAL FLUID COMPRISING SAME

BACKGROUND

Electrorheological fluids are compositions that generally include dielectric particles suspended in a dielectric base fluid, and that show a change in viscosity when in the presence of an electric field. Since the dielectric constant is greater than that of the base fluid, these particles are polarized in the presence of an external electric field. Upon polarization in the electrical field, the particles interact by aligning and orienting to form chain-like and/or lattice-like structures within the fluid. In turn, the aligned particles cause an increase in the effective viscosity of the bulk fluid. Removal of the electric field causes the particles to de-orient and to adopt an amorphous configuration, and hence, viscosity in turn decreases.

Typically, such electrorheological fluids include polarizable materials with a low conductivity and a high dielectric constant, such as low molecular weight phenolic/phenolate oligomers, salts of (meth)acrylate oligomers and polymers, and other such materials, suspended in a dielectric fluid such as a silicone or mineral oil. However, there remains a need for electrorheological fluids with improved properties such as a greater range of effective viscosity for a given electrical field strength and loading of the polarizable dielectric material, and a faster response time as well as high temperature performance.

SUMMARY

The above and other deficiencies in the prior art are be overcome by, in an embodiment, an electrorheological fluid, comprising a nanoparticle composition comprising a nanoparticle, uncoated or coated with a polymeric or metallic coating and covalently bonded to or coated on a surface of a polymeric or inorganic particle; and a dielectric fluid having a dielectric constant lower than that of the nanoparticle composition.

In another embodiment, a nanoparticle composition comprises a carbon-based nanoparticle, covalently bonded to or coated on a surface of a conjugated polymer particle or inorganic particle, wherein the nanoparticle composition is a dielectric material.

In another embodiment, an electrorheological fluid, comprises a nanoparticle composition comprising a nanoparticle comprising a fullerene, a carbon nanotube, a boron nitride nanotube, nanographite, graphene, graphene fiber, carbon black, a nanodiamond, an inorganic nanoparticle, a nanoclay, a polysilsesquioxane, a metal particle, or a combination comprising at least one of the foregoing, covalently bonded to or coated on a surface of a polymeric or inorganic particle; and a dielectric fluid having a dielectric constant lower than that of the nanoparticle composition.

DETAILED DESCRIPTION

Disclosed herein is an electrorheological fluid prepared from a nanoparticle composition in which a polarizable, dielectric nanoparticle is attached to or coated on a support material with low conductivity and high dielectric constant. In other embodiments, combinations of dielectric nanoparticles are used as a coating on the support material. In some embodiments, the nanoscale particles are carbon-based polarizable nanoparticles such as derivatized or non-derivatized carbon nanotubes or graphene, or inorganic dielectric nanoparticles such as urea-coated barium titanyl oxalate, coated on a support which is inorganic or organic, and where organic, is a conducting or non-conducting polymer. Such materials provide a high degree of polarizability, and hence solution structuring necessary to form linear or network arrangements upon exposing the electrorheological fluid to an electrical field. The nanoparticle composition, because of its high thermal stability and high polarizability, also imparts improved high temperature performance to the electrorheological fluids.

The electrorheological fluid includes a nanoparticle composition comprising a nanoparticle. Nanoparticles are particles with an average particle size (largest average dimension) of about 1 nanometer (nm) to less than about 1 micrometer (μm). In some embodiments, the nanoparticles have an average particle size of less than about 1 micrometer (μm), and more specifically a largest average dimension less than or equal to about 500 nanometer (nm), and still more specifically less than or equal to about 250 nm, where particle sizes of greater than about 250 nm to less than about 1 μm are also be referred to in the art as "sub-micron sized particles."

In other embodiments, the average particle size is greater than or equal to about 1 nm, specifically 1 to about 250 nm, and more specifically about 1 to about 100 nm. In still other embodiments, the average particle size (largest dimension) of the nanoparticle is greater than or equal to 1 μm, specifically 1 to 25 μm, more specifically 1 to 20 μm, still more specifically 1 to 10 μm. As used herein, "average particle size" and "average largest dimension" can be used interchangeably, and refer to particle size measurements based on number average particle size measurements, which can be routinely obtained by laser light scattering methods such as static or dynamic light scattering (SLS or DLS, respectively). Also in an embodiment, the nanoparticles have an aspect ratio of greater than about 10, and more particularly, greater than about 50.

Useful nanoparticles include fullerenes, nanotubes, nanographite, graphene, graphene fiber, carbon black, nanodiamonds, inorganic nanoparticles, nanoclays, metal particles, or a combination comprising at least one of the foregoing.

Fullerenes, as disclosed herein, include any of the known cage-like hollow allotropic forms of carbon possessing a polyhedral structure. Fullerenes include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes include carbon nanotubes, inorganic nanotubes such as boron nitride nanotubes, metallated nanotubes, or a combination comprising at least one of the foregoing. Nanotubes are tubular structures having open or closed ends and which are inorganic (e.g. boron nitride) or made entirely or partially of carbon. In an embodiment, carbon and inorganic nanotubes include additional components such as metals or metalloids, which are incorporated into the structure of the nanotube, included as a dopant, form a surface coating, or a combination comprising at least one of the foregoing. Nanotubes, including carbon nanotubes and inorganic nanotubes, are single walled nanotubes (SWNTs) or multi-walled nanotubes (MWNTs).

Nanographite is a nano-scale cluster of plate-like sheets of graphite, in which a stacked structure of one or more layers having a plate-like two dimensional structure of carbon in the form of fused hexagonal rings with an extended delocalized π-electron system, which are layered and weakly bonded to one another through π-π stacking interaction. Nanographite has a layered structure of greater than or equal to about 50 single sheet layers, specifically greater than or equal to about 100 single sheet layers, and more specifically greater than or equal to about 500 single sheet layers.

Graphene, sometimes referred to herein as nanographene, includes both graphene having an average largest dimension of greater than or equal to 1 µm, and nanographene having an average largest dimension of less than 1 µm. Graphenes, including nanographene, are effectively two-dimensional, having a stacked structure of one or more layers of fused hexagonal rings, layered and weakly bonded to one another through π-π stacking interaction. In an exemplary embodiment, graphene has an average particle size of 1 to 5 µm, and specifically 2 to 4 µm. Graphenes have an average smallest particle size (smallest average dimension, i.e., thickness) of less than or equal to about 50 nm, more specifically less than or equal to about 10 nm, and still more specifically less than or equal to 5 nm. Graphene (including nanographene) has less than about 50 single sheet layers, specifically less than about 10 single sheet layers, and more specifically less than or equal to about 5 single sheet layers, or is as little as a single sheet thick.

Carbon black includes particulate carbon formed by the pyrolysis/incomplete combustion of heavy petroleum products. Carbon black is primarily an amorphous form of carbon having a greater or lesser concentration of graphitic phase distributed throughout the pigment.

Nanodiamonds are diamond particles having an average particle size of less than one micrometer (µm). The nanodiamonds are from a naturally occurring source, such as a by-product of milling or other processing of natural diamonds, or are synthetic, prepared by any suitable commercial method.

Nanoclays are hydrated or anhydrous silicate minerals with a layered structure and include, for example, alumino-silicate clays such as kaolins including hallyosite, smectites including montmorillonite, illite, and the like. Exemplary nanoclays include those marketed under the tradename CLOISITE® marketed by Southern Clay Additives, Inc. In an embodiment, nanoclays are exfoliated to separate individual sheets, or are non-exfoliated.

Inorganic nanoparticles include a metal or metalloid carbide such as tungsten carbide, silicon carbide, boron carbide, or the like; a metal or metalloid nitride such as titanium nitride, boron nitride, silicon nitride, or the like; a metal or metalloid oxide such as titanium oxide, alumina, silica, tungsten oxide, iron oxides, combinations thereof, or the like; or a combination comprising at least one of the foregoing.

Metal nanoparticles include, for example, those made from metals such as iron, tin, titanium, platinum, palladium, cobalt, nickel, vanadium, alloys thereof, or a combination comprising at least one of the foregoing. Ceramic nanoparticles coated with any of these metals are also useful.

The nanoparticle is derivatized to include functionality for adjusting surface properties and blendability of the nanoparticles with a matrix (e.g., dielectric fluids for the electrorheological fluid solution, etc.). For example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, ionic groups such as ammonium groups and/or carboxylate salt groups, or a combination comprising at least one of the forgoing functional groups. The nanoparticles are derivatized to introduce chemical functionality to the nanoparticle. For example, for nanographene, the surface and/or edges of the nanographene sheet is derivatized to increase dispersibility in and interaction with the polymer matrix.

The nanoparticle is uncoated, or is or coated with a polymeric, inorganic, or metallic coating. Exemplary polymeric coatings include those derived from epoxies, (meth)acrylates, styrenes, polyesters, polyamides, polyimides, fluoropolymers, polycarbonates, polyethers, polysulfides, copolymers thereof, and a combination comprising at least one of the foregoing. As used herein, "(meth)acrylate" means any acrylate or methacrylate compound, or combination thereof, including the parent acid. Exemplary inorganic coatings include metal oxides such as silica, titania, alumina, zirconia, and the like; metal nitrides such as boron nitride, silicon nitride, titanium nitride, and the like, metal complexes such as those based on transition metals including inorganic and organometallic complexes of cobalt, copper, iron, nickel, tungsten, rhenium, molybdenum, and a combination comprising at least one of the foregoing. Exemplary metallic coatings include aluminum, cobalt, copper, gold, iron, magnesium, manganese, nickel, platinum, palladium, silver, tungsten, alloys thereof, and a combination comprising at least one of the foregoing. One or more such coatings may be included on the substrate.

In another embodiment, the nanoparticle can be derivatized to include functional groups such as alkyl, aryl, aralkyl, alkaryl, functionalized polymeric or oligomeric groups, or a combination comprising at least one of the foregoing groups. In an exemplary embodiment, the nanoparticle is a carbon-based nanoparticle including graphene, a carbon nanotube, nanographite, or carbon black. In another exemplary embodiment, the derivatized nanoparticle is graphene having functional groups attached directly to the graphene by a carbon-carbon bond without intervening heteroatoms; by a carbon-oxygen bond; or by a carbon-nitrogen bond.

The nanoparticle composition further includes a support. The nanoparticle is covalently bonded to or coated on a surface of the polymeric or inorganic support particle. Where the attachment is covalent, the nanoparticle is functionalized as above, and the support particle is functionalized to have a complementary functional group, where the artisan skilled in the art will appreciate which pairings of functional groups are complementary with those listed for the nanoparticles where functionalized. For example, where the nanoparticle has hydroxy groups, the support particle has a group such as a carboxylate, to form an ester. Similarly, where the nanoparticle has a carboxylate group on it, the support particle has a hydroxy, amine, or epoxy group. Combinations of compatible functional groups are useful. Thus, in an embodiment, where a derivatized functional group is used, the substrate particle is derivatized on its surface to include, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, ionic groups such as ammonium groups and/or carboxylate salt groups, or a combination comprising at least one of the forgoing functional groups, provided these groups are complementary and as such form a bond with a corresponding group on the derivatized nanoparticle.

The support material is a polymeric or inorganic particle. In some embodiments, the support material is a nanoscale particle (i.e., with an average smallest dimension of less than 1 µm). In other embodiments, the support material is micro scale (i.e., 1 µm or greater). Combinations of particles, including those having different particle sizes, can also be used.

In an embodiment, the polymeric particle includes a styrenic polymer or copolymer, a (meth)acrylate polymer or copolymer, or a highly conjugated aromatic polymer. It will be appreciated that where a highly conjugated aromatic polymer is used, the polymer is desirably in a non-conducting (i.e., non-doped) form, so that the polymer is polarizable but not conductive.

Exemplary non-conjugated polymeric particles include those formed of polystyrene, poly(styrene-co-(meth)acrylates), and poly(meth)acrylates (including metal salts of (meth)acrylic acids). Exemplary conjugated polymeric particles include those formed of polyaniline, polythiophene, polyphenylenevinylene, polypyrrole. Combinations comprising at least one of the foregoing polymers can also be used. Such highly conjugated aromatic polymers can be more readily polarized and as such have a higher dielectric constant than, for example, a poly(meth)acrylate polymer.

Similarly, inorganic particles include those having high polarizability and generally high dielectric constant (i.e., greater than or equal to about 4, when measured at 1 KHz). Useful inorganic particles include ceramics, metal oxides, metals, or a combination comprising at least one of the foregoing.

Exemplary ceramic particles include barium titanyl oxalate, barium titanate, boron nitride, titanium nitride, silicon nitride, tantalum nitride, or a combination comprising at least one of the foregoing.

Exemplary metal oxides include barium titanate, iron oxide, nickel oxide, cobalt oxide, tungsten oxides, titanium dioxide, zirconium dioxide, hafnium dioxide, zinc oxide, cupric oxide, cuprous oxide, alumina, silica, or a combination comprising at least one of the foregoing.

Exemplary metal particles include iron, nickel, cobalt, manganese, zinc, copper, titanium, gold, platinum, tin, aluminum, tantalum, molybdenum, rhodium, or a combination comprising at least one of the foregoing.

In an embodiment, the nanoparticle further comprises a coating. In an embodiment, coatings are included where the particles can conduct electricity such as where the particles are a conjugated polymer, ceramic, or metal; where the particles require further compatibilizing with the surrounding matrix, or where the particles are stabilized by the presence of the coating. In an embodiment, the coating includes an organic compound, a polymer, a ceramic, a metal, an oxide, or a combination comprising at least one of the foregoing. One or more of the above polymers, ceramics, oxides, and metals are useful as coatings.

Organic compounds also useful as coatings include ligands and coordinating compounds including chelators. Such compounds include amines including mono, di, and polyamines, including primary, secondary, and tertiary amines; amides; carboxylate-based compounds such as carboxylic acids and their salts; ureas including ureas and polyureas; hydroxamic acids; compounds including combinations of one or more of these functional groups; combinations comprising at least one of the foregoing, and the like. Exemplary such compounds include ethylene diamine, diethylene triamine, citric acid, tartaric acid, ethylene diamine tetraacetic acid (EDTA), ethylene glycol diamine tetraacetic acid (EGTA), citrate, tartrate, oxalate, urea, and the like.

In an embodiment, a coated inorganic particle is a urea-coated barium titanyl oxalate.

In an embodiment, the nanoparticle is covalently attached to the core, is non-covalently attached to the core (e.g., by dispersion forces, electrostatic forces, dipole-dipole interaction, ion-pairing, or other non-covalent bonding), or is simply coated on the core. The nanoparticles coating the substrate particle form a shell that is contiguous or intermittent, and which entirely or partially covers the surface of the substrate particle. In another embodiment, the substrate is an inorganic particle coated with a polymer, an organic particle coated with an inorganic coating, or a combination comprising at least one of the foregoing.

Selection of the components for the nanoparticle composition thus allows for adjusting of net properties of the nanoparticle composition, to provide a range of dielectric constants without fundamentally changing the nanoparticle itself, by selection of the core, or by changing the net properties of the nanoparticle composition by selection of the nanoparticles attached to the core, by selecting the loading of the nanoparticle, or a combination of these. It is therefore a useful compositional lever to vary the dielectric constant, and hence polarizability, of the nanoparticle and substrate particle, to provide a wide variety of improvements to an electrorheological fluid.

Thus, in an embodiment, the nanoparticle composition is a carbon-based nanoparticle covalently bonded to or coated on a surface of a conjugated polymer particle or inorganic particle, wherein the nanoparticle composition is a dielectric material. In a further embodiment, the carbon-based nanoparticle is a nanotube, a fullerene, graphene, carbon black, nanographite, or a combination comprising at least one of the foregoing.

In another embodiment, the nanoparticle composition includes graphene, covalently bonded to a surface of a polymer particle or inorganic particle, wherein the nanoparticle composition is a dielectric material. In a specific embodiment, the polymer particle is a polystyrene bead or polyaniline. In another embodiment, the inorganic particle comprises urea-coated barium titanyl oxalate.

In an embodiment, the nanoparticle composition includes nanoparticles included in an amount of about 0.1 to about 90 wt %, in an embodiment, 1 to about 80 wt %, in another embodiment about 5 to about 70 wt %, and in still another embodiment about 10 to about 50 wt %, based on the total weight of nanoparticle composition.

The electrorheological fluid further includes a dielectric fluid having a lower dielectric constant than the nanoparticle composition.

In an embodiment, the dielectric constant of the dielectric fluid is lower than that of the nanoparticle composition. In an embodiment, the difference in dielectric constant between the nanoparticle composition and the dielectric fluid is greater than or equal to about 0.1, in an embodiment, greater than or equal to about 0.5, and in another embodiment, greater than or equal to about 1.0, measured at 1 KHz. Dielectric fluids include organic and/or inorganic fluids, and are aqueous or non-aqueous. Inorganic fluids include water, mineral acids, solutions thereof, and the like. In an embodiment, the dielectric fluid is non-aqueous, and is an organic fluid. In an exemplary embodiment, the dielectric fluid is an oil, such as a mineral oil or petroleum distillate residue having a relatively low volatility (e.g., as obtained for hydrocarbons with an average chain length of $C_8$ or greater). In another embodiment, the dielectric fluid is inorganic/organic hybrid fluid, such as a silicone oil including low molecular weight polydimethylsiloxanes. In another embodiment, the dielectric fluid is an ionic liquid such as those based on halide salts of pyridinium cations, imidazolium cations, and the like. It will be appreciated that where the dielectric fluid has a relatively high dielectric constant, the nanoparticle composition components are selected such that the dielectric constant of the nanoparticle composition remains greater than that of the dielectric fluid.

In an embodiment, the nanoparticle composition is included in the electrorheological fluid in an amount of about 0.1 to about 60 wt %, in an embodiment, 1 to about 50 wt %, and in another embodiment about 5 to about 45 wt %, based on the total weight of nanoparticle composition and dielectric fluid.

The viscosity of such a fluid is about 1 centistoke or greater, but is not limited thereto. In an embodiment, the dielectric constant of the dielectric fluid is less than about 4, as measured at 1 KHz. In some embodiments, the electrorheological fluid exhibits an expansion of volume of greater than or equal to about 10%, in an embodiment, greater than or equal to about 25%, and in another embodiment, greater than or equal to about 50%.

In another embodiment, an electrorheological fluid includes a nanoparticle composition including a nanoparticle comprising a fullerene, a nanotube, nanographite, graphene, graphene fiber, carbon black, a nanodiamond, an inorganic nanoparticle, a nanoclay, a metal particle, or a combination comprising at least one of the foregoing, covalently bonded to or coated on a surface of a polymeric or inorganic particle; and a dielectric fluid having a lower dielectric constant than the nanoparticle composition.

The nanoparticle composition reversibly forms chain or lattice structures in the dielectric fluid upon exposure to an electrical field. Such compositions are useful in a variety of downhole applications to generate a hydraulic pressure, which can in turn be used to actuate valves, switches, pistons, and to operate downhole tools such as expandable plugs.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant (s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. An electrorheological fluid, comprising:
a nanoparticle composition comprising:
a derivatized nanoparticle covalently bonded to or coated on
a surface of a polymeric or inorganic particle; and
a dielectric fluid having a dielectric constant lower than that of the nanoparticle composition,
wherein the derivatized nanoparticle comprises a nanoparticle and a functional group covalently bonded to the nanoparticle, the functional group comprising carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups, and
wherein the derivatized nanoparticle is further coated with a polymeric or metallic coating before covalently bonded to or coated on a surface of the polymeric or inorganic particle.

2. The electrorheological fluid of claim 1, wherein the nanoparticle comprises a fullerene, a nanotube, nanographite, graphene, graphene fiber, carbon black, a nanodiamond, a polysilsesquioxane, an inorganic nanoparticle, a nanoclay, a metal particle, or a combination comprising at least one of the foregoing.

3. The electrorheological fluid of claim 1, wherein the nanoparticle is graphene, a carbon nanotube, nanographite, or carbon black, and the functional groups are alkyl, aryl, aralkyl, alkaryl, functionalized polymeric or oligomeric groups, or a combination comprising at least one of the foregoing groups.

4. The electrorheological fluid of claim 3, wherein the nanoparticle is graphene and the functional groups are attached directly to the graphene by a carbon-carbon bond without intervening heteroatoms; by a carbon-oxygen bond; or by a carbon-nitrogen bond.

5. The electrorheological fluid of claim 1, wherein the polymeric particle comprises a styrenic polymer or copolymer, a (meth)acrylate polymer or copolymer, or a highly conjugated aromatic polymer.

6. The electrorheological fluid of claim 1, wherein the polymeric particle is a polystyrene, poly(styrene-co-(meth) acrylate), poly(meth)acrylate, polyaniline, polythiophene, polyphenylenevinylene, polypyrrole, or a combination comprising at least one of the foregoing.

7. The electrorheological fluid of claim 1, wherein the nanoparticle composition reversibly forms chain or lattice structures in the dielectric fluid upon exposure to an electrical field.

8. The electrorheological fluid of claim 1, wherein the inorganic particle comprises urea-coated barium titanyl oxalate.

9. An electrorheological fluid, comprising:
a nanoparticle composition comprising:
a nanoparticle covalently bonded to or coated on
a surface of an inorganic particle; and
a dielectric fluid having a dielectric constant lower than that of the nanoparticle composition,
wherein the inorganic particle comprises a ceramic, a metal oxide, a metal, or a composite comprising at least one of the foregoing; and
wherein the nanoparticle is further coated with a polymeric or metallic coating before covalently bonded to or coated on a surface of an inorganic particle.

10. The electrorheological fluid of claim 9, wherein the ceramic comprises barium titanyl oxalate, boron nitride, titanium nitride, silicon nitride, tantalum nitride, or a combination comprising at least one of the foregoing.

11. The electrorheological fluid of claim 9, wherein the metal oxide comprises barium titanate, iron oxide, nickel oxide, cobalt oxide, tungsten oxides, titanium dioxide, zirconium dioxide, hafnium dioxide, zinc oxide, cupric oxide, cuprous oxide, alumina, silicon dioxide, or a combination comprising at least one of the foregoing.

12. The electrorheological fluid of claim 9, wherein the metal comprises iron, nickel, cobalt, manganese, zinc, copper, titanium, gold, platinum, tin, aluminum, tantalum, molybdenum, rhodium, or a combination comprising at least one of the foregoing.

13. The electrorheological fluid of claim 9, wherein the inorganic particle comprises urea-coated barium titanyl oxalate.

* * * * *